United States Patent [19]
Matsuura et al.

[11] Patent Number: 5,902,388
[45] Date of Patent: May 11, 1999

[54] EMULSION INK FOR STENCIL PRINTING

[75] Inventors: Tomoko Matsuura; Teruaki Okawa, both of Inashiki-gun, Japan

[73] Assignee: Riso Kagaku Corporation, Tokyo, Japan

[21] Appl. No.: 08/883,663

[22] Filed: Jun. 27, 1997

[30] Foreign Application Priority Data

Jun. 27, 1996 [JP] Japan ................................. 8-188463

[51] Int. Cl.$^6$ ................................................... C09D 11/02
[52] U.S. Cl. ..................................... 106/31.25; 106/31.26
[58] Field of Search ............................... 106/31.25, 31.26

[56] References Cited

U.S. PATENT DOCUMENTS 5,637,137  6/1997  Okuda et al. ........................ 106/31.26
5,667,570  9/1997  Okuda et al. ........................ 106/31.26

FOREIGN PATENT DOCUMENTS

A-0211325  2/1987  European Pat. Off. .
A-0741174  11/1996  European Pat. Off. .
A2-744448  11/1996  European Pat. Off. .
6-212108  8/1994  Japan .

*Primary Examiner*—Helene Klemanski
*Attorney, Agent, or Firm*—Pillsbury Madison & Sutro LLP

[57]  ABSTRACT

An emulsion ink for stencil printing is provided, which is high in transparency and does not hide previously a printed pattern when it is overlaid or printed on the pattern so as to facilitate multicolor printing with conventional stencil printing machines. The emulsion ink comprises an oil phase and a water phase and contains in the oil phase a coloring pigment together with an extending pigment that is insoluble in the oil phase, in which the ink has an optical density value of 1.0 or more as measured by a reflection densitometer when the ink is applied and dried in a thickness of 50 μm onto a transparent sheet placed on a black standard board, and in which the ink has an optical density value of 0.7 or less as measured by the reflection densitometer when the transparent sheet is placed on a white standard board. Preferably, the coloring pigment constitutes 0.02 to 1%, and the extending pigment constitutes 1 to 5% by weight, of the total weight of the ink.

14 Claims, No Drawings

EMULSION INK FOR STENCIL PRINTING

The present invention relates to emulsion ink for stencil printing, and more specifically relates to ink which is so transparent that it does not hide previously printed patterns when printed thereon.

Stencil printing is effected by perforating a stencil sheet to make a master, and passing ink through the perforated portions of the master to an article to be printed such as printing paper. Since the master is easy to make, stencil printing is utilized in a wide range of fields.

As stencil printing ink, water-in-oil (W/O) emulsion ink is usually used which contains pigments as colorants in the oil phase thereof. Since different colors of ink are supplied depending upon kinds of colorants, multicolor printing is also possible using these colors of ink.

Multicolor stencil printing is often effected by pre-printing a pattern in outline on printing paper, and then overlaying the printing paper with stencil printing to color the regions within the outline of the pattern. However, if masters used for the overlay printing are not accurately perforated or are not accurately positioned on the printing paper upon printing, color discords with the pattern, making the finish of printing messy. Furthermore, since conventional ink for stencil printing lacks transparency, such discordance of coloring causes the previously printed pattern to be hidden so that a desired effect of multicolor printing cannot be attained.

In order to solve such a problem, it has been suggested that a mechanism for enhancing master-making accuracy or printing accuracy is added to the stencil printing machine. However, this makes the machine complicated, and damages simplicity and reasonable price of the stencil printing machine.

The object of the present invention is to provide emulsion ink for stencil printing, which is so transparent that it can be printed on previously printed patterns without the patterns being hidden using conventional stencil printing machines.

According to the present invention, the above object has been attained by an emulsion ink for stencil printing, which comprises an oil phase and a water phase and contains in the oil phase a coloring pigment together with an extending pigment that is insoluble in the oil phase, in which the ink has an optical density (hereinafter referred to as "OD") value of 1.0 or more as measured by a reflection densitometer when the ink is applied and dried in a thickness of 50 $\mu$m onto a transparent sheet placed on a black standard board, and in which the ink has an OD value of 0.7 or less as measured by said reflection densitometer when the transparent sheet is placed on a white standard board.

That is, according to the present invention, emulsion ink for stencil printing is provided, which is so transparent as not to hide a previously printed pattern when printed on the previously printed pattern, whether the pattern is printed with ink of a bright color or a dark color. When the OD value is less than 1.0 on the black standard board, the ink hides the dark color of the previously printed pattern, and desired effect of multicolor printing is not obtained. When the OD value is more than 0.7 on the white standard board, ink hides bright color of the previously printed pattern, and desired effect of multicolor printing is not obtained. Preferably, the OD value is 1.1 or more on the black standard board, and 0.6 or less on the white standard board.

The water-in-oil (W/O) emulsion ink having such transparency can be made by, for example, having the oil phase of the ink contain a coloring pigment together with an oil-insoluble extending pigment while an addition amount of the coloring pigment is limited to 0.02 to 1%, preferably 0.05 to 0.9% by weight based on the total weight of the ink. If the amount of coloring pigment is less than 0.02% by weight, sufficient color is not exhibited. If the amount is more than 1% by weight, the ink is deteriorated in transparency and hides previously printed patterns when printed thereon.

Generally speaking, if concentration of pigments in the ink is reduced, transparency of the ink is enhanced. However, in case of emulsion ink, viscosity of ink is also lowered, and blurring of printing or set-off also occur, deteriorating the finish of prints. However, since extending pigments are contained in the oil phase according to the present invention, transparency of emulsion ink is not affected and the ink also maintains its viscosity as high as conventional emulsion ink for stencil printing.

According to the present invention, various colors of ink excellent in transparency, can be provided for stencil printing thanks to the interaction between coloring pigments and extending pigments. Since the present ink does not hide previously printed patterns when printed thereon, it facilitates multicolor printing with conventional stencil printing machines and makes it possible to provide prints with watercolor-like painting by virtue of transparency of the ink.

An addition amount of the extending pigment can be varied depending upon desired viscosity of ink. When the present stencil printing ink is designed for use in portable stencil printing machines, it is prepared to have a consistency represented by 32 or less of a flow value in one minute measured by a spreadometer, and typically contains the extending pigment in an amount of 1 to 5% by weight based on the total weight of the ink. When the addition amount of the extending pigment is less than 1% by weight, the ink tends to blot on printing paper. When it is more than 5% by weight, the ink becomes too viscous to pass perforated portions of stencil sheets upon printing.

As the extending pigment, organic or inorganic fine particles can be used which can pass light or are transparent in the oil phase. Examples of the inorganic fine particles are calcium carbonate, precipitated barium sulfate, barite powder, silica, alumina white, aluminum hydroxide, kaolin, clay, talc, bentonite, and the like. These inorganic fine particles are preferably those which have been subjected to lipophilic treatment in order to ensure pot life of emulsion. Such lipophilic treatment includes a treatment with a resin acid or fatty acid and a treatment with silicone resin. The organic fine particles should be insoluble or should not be dissolved in the oil phase substantially. Examples of the organic fine particles are fine particles of polyacrylic acid esters, polyurethane, polyethylene, polypropylene, polyvinyl chloride, waxes and the like.

The coloring pigment is not limited, but may be any known pigments. Examples of the coloring pigment for use in monochrome ink are carbon blacks such as furnace carbon black, lampblack, acetylene black and channel black. The coloring pigment may be organic pigments such as azo pigments, cyanine pigments, dioxazines pigments, and quinacridone pigments.

The oil phase of the present W/O emulsion ink at least comprises the above coloring pigment, the above extending pigment, a solvent consisting of a non-volatile solvent and/or a volatile solvent, and an emulsifier. The oil phase may further comprise a resin in order to adjust viscosity of ink or improve printability such as fixation of ink.

As the non-volatile solvent, mineral oils such as motor oils, spindle oils, machine oils and liquid paraffin, and vegetable oils such as olive oil, castor oil, salad oils can be used and soybean oil. As the volatile solvent, known solvents of the types of mineral oils and vegetable oils can be used.

The emulsifier is used to form the W/O emulsion of the ink, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like.

As the resin, mention may be made of rosin ester, rosin-modified maleic resin, rosin-modified phenolic resin, alkyd resin, petroleum resin, xylene resin, polyamide resin, and the like.

The water phase of the present invention can be water to which water soluble additives such as wetting agents, electrolytes, antifungal agents, antioxidants, water evaporation inhibiting agents and the like are optionally added.

The present water-in-oil (W/O) emulsion ink can be made, for example, by gradually adding 90 to 30% by weight of the above mentioned water phase to 10 to 70% by weight of the above mentioned oil phase to emulsify the mixture by use of a stirrer or the like.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Examples 1–7, Comparative Examples 1–3

A water-in-oil (W/O) emulsion ink was prepared in accordance with the formulation shown in Table 1 in a manner mentioned below. First, a varnish was prepared by adding a resin to a solvent and dissolving it therein by heat. After a coloring pigment, an extending pigment and an emulsifier were added to and mixed with the varnish, the mixture was kneaded by use of a mill having three rollers. The solvent was further added to the kneaded product under stirring to obtain an oil phase.

Then, a water phase was obtained by adding glycerin to an ion-exchanged water. A water-in-oil (W/O) emulsion ink for stencil printing was prepared by gradually adding the water phase to the oil phase under stirring by a stirrer to cause emulsification. A flow value in one minute was measured by a spreadometer in terms of the resultant emulsion ink in a manner described in Japanese Patent Publication (Kokoku) No. 23601/79 the procedure of which is equivalent to JIS (Japanese Industrial Standards) K 5701.

Performance tests

Each emulsion ink for stencil printing obtained in Examples 1 to 7 and Comparative Examples 1 to 3 was evaluated in terms of transparency of ink, blurring of printing, OD value ( i.e., reflection density) on the black standard board, and OD value (i.e., reflection density) on the white standard board, in the manners as mentioned below. The results are shown in Table 2.

(1) Transparency of ink (observed with the naked eye): A pattern was previously printed with a brown ink on pieces of printing paper. Then, another printing was effected on the pattern with a portable stencil printing machine "PRINT GOCCO" (trademark) manufactured by RISO KAGAKU CORPORATION using each of the above emulsion ink for stencil printing. When it was observed with the naked eye that a watercolor-like pale color was provided with the paper without the previously printed pattern being hidden, the result was shown as (++). When it was observed with the naked eye that the previously printed pattern was hidden and existence of the pattern was not noticed, the result was shown as (−). When the observation with the naked eye was between (++) and (−), the result was shown as (+). When it was observed with the naked eye that color of ink used for the latter printing was too pale to notice existence of the latter printing, the result was shown as (=).

(2) Blurring of printing: Stencil printing was effected on pieces of printing paper with a portable stencil printing machine "PRINT GOCCO" (trademark) manufactured by RISO KAGAKU CORPORATION using each of the above obtained emulsion ink. Then, state of blurring was observed with a loupe of 10 magnifications at portions of the obtained prints on which printing ink was deposited. When little blurring was observed, the result was shown as (+). When blurring was remarkable, the result was shown as (−).

(3) Reflection density (OD value): A coat of ink was formed by applying ink in a thickness of 50 μm onto a transparent polyester film of 50 μm in thickness with a YBA-type baker applicator, and then dried under environmental conditions. Then, OD value (reflection density) on a black standard board and OD value (reflection density) on a white standard board were measured in accordance with the following procedures. Meanwhile, the black standard board and the white standard board were standard boards for density calibration for use with a reflection densitometer Macbeth RD920 manufactured by Kollmorgen corp. The black standard board had a black density of 1.80. The white standard board had a white density of 0.05.

(3-1) OD value on black standard board: The above polyester film was placed on the above black standard board, and a reflection density on the ink coat was measured by use of the above reflection densitometer.

(3-2) OD value on white standard board: The above polyester film was placed on the above white standard board, and a reflection density on the ink coat was measured by use of the above reflection densitometer.

TABLE 1

Formulations of W/O emulsion ink (parts by weight)

| Number of Examples | Ex.1 | Ex.2 | Ex.3 | Ex.4 | Ex.5 | Ex.6 | Ex.7 | C.Ex.1 | C.Ex.2 | C.Ex.3 |
|---|---|---|---|---|---|---|---|---|---|---|
| Oil phase: | | | | | | | | | | |
| Coloring pigments: | | | | | | | | | | |
| Carmine 6B | 1.0 | 0.5 | 0.1 | 0.02 | — | — | — | 2.5 | 0.01 | — |
| Carbon black | — | — | — | — | — | — | 0.05 | — | — | — |
| Cyanine blue | — | — | 0.001 | — | 0.1 | — | — | — | — | — |
| Disazo yellow | — | — | — | — | — | 1.0 | — | — | — | 1.3 |
| Extending pigments: | | | | | | | | | | |
| Silica | 2.0 | — | — | 2.0 | 3.0 | — | 3.0 | — | — | 2.0 |
| Calcium carbonate | — | 2.0 | — | — | — | 2.0 | — | — | — | — |
| Polyethylene powder | — | — | 2.0 | — | — | — | — | — | — | — |

TABLE 1-continued

Formulations of W/O emulsion ink (parts by weight)

| Number of Examples | Ex.1 | Ex.2 | Ex.3 | Ex.4 | Ex.5 | Ex.6 | Ex.7 | C.Ex.1 | C.Ex.2 | C.Ex.3 |
|---|---|---|---|---|---|---|---|---|---|---|
| Resin: | | | | | | | | | | |
| Alkyd resin | 2.0 | 2.0 | 2.0 | 2.0 | 2.0 | 2.0 | 2.0 | 2.0 | 2.0 | 2.0 |
| Rosin-modified phenolic resin | 4.0 | 7.0 | 7.0 | — | 7.0 | 7.0 | 7.0 | 7.0 | 7.0 | 7.0 |
| Petroleum resin | 4.0 | — | — | 8.0 | — | — | — | — | — | — |
| Emulsifier: | | | | | | | | | | |
| Sorbitan monooleate | 3.0 | 3.0 | 3.0 | 3.0 | 3.0 | 3.0 | 3.0 | 3.0 | 3.0 | 3.0 |
| Solvent: | | | | | | | | | | |
| No. 6 Solvent (manufactured by Nippon Oil Co. Ltd.) | 13.0 | 14.0 | 13.9 | 15.0 | 12.9 | 13.0 | 14.0 | 14.0 | 13.0 | 12.7 |
| #40 Motor oil | 1.0 | 1.5 | 2.0 | 3.0 | 2.0 | 2.0 | 3.0 | 1.5 | 5.0 | 2.0 |
| Water phase: | | | | | | | | | | |
| Water: | | | | | | | | | | |
| Ion-exchanged water | 65.0 | 65.0 | 65.0 | 65.0 | 65.0 | 65.0 | 65.0 | 65.0 | 65.0 | 65.0 |
| Water evaporation inhibiting agent: | | | | | | | | | | |
| Glycerin | 5.0 | 5.0 | 5.0 | 5.0 | 5.0 | 5.0 | 5.0 | 5.0 | 5.0 | 5.0 |

Note: "Ex." refers to Example, and "C.Ex." refers to Comparative Example.

TABLE 2

Results of performance tests

| Number of Examples | Ex.1 | Ex.2 | Ex.3 | Ex.4 | Ex.5 | Ex.6 | Ex.7 | C.Ex.1 | C.Ex.2 | C.Ex.3 |
|---|---|---|---|---|---|---|---|---|---|---|
| Transparency of ink (observed with naked eye): | (+) | (++) | (++) | (++) | (++) | (++) | (++) | (−) | (=) | (−) |
| Blurring of printing: | (+) | (+) | (+) | (+) | (+) | (+) | (+) | (+) | (−) | (+) |
| OD value on black standard board: | 1.3 | 1.4 | 1.56 | 1.57 | 1.6 | 1.0 | 1.6 | 1.49 | 1.6 | 0.72 |
| OD value on white standard board: | 0.61 | 0.53 | 0.19 | 0.14 | 0.34 | 0.11 | 0.18 | 1.08 | 0.09 | 0.12 |
| Flow value in one minute measured by spreadometer: | 24 | 24 | 25 | 24 | 25 | 24 | 25 | 24 | 34 | 24 |

Note: "Ex." refers to Example, and "C.Ex." refers to Comparative Example.

The emulsion ink of Examples 1 to 7, which contained extending pigments as well as coloring pigments in amounts of 0.02 to 1% by weight based on the total weight of the ink, was excellent in transparency and caused little blurring. Ink of Examples 2 to 5 and 7, which contained coloring pigments in amounts of 1% by weight or less based on the total weight of the ink, was particularly excellent in transparency. On the other hand, ink of Comparative Examples 1 and 3, which contained large amounts of coloring pigments, caused little blurring, but did not show practical transparency. Ink of Comparative Example 2, which contained a very small amount of coloring pigment, was excellent in transparency, but had insufficient color and caused blurring.

According to the present invention, by virtue of interaction between coloring pigments and extending pigments, an emulsion ink for stencil printing is provided, which is excellent in transparency, has a viscosity suitable for handling, and causes little blurring on printing paper. The present emulsion ink does not hide previously a printed pattern when it is overlaid or printed on the pattern, and thus multicolor printing can be readily effected with conventional stencil printing machines. Moreover, by virtue of the transparency of the present ink, a watercolor-like taste can be provided with prints.

We claim:

1. An emulsion ink for stencil printing, which comprises an oil phase and a water phase and contains in said oil phase a coloring pigment together with an extending pigment that is insoluble in said oil phase, in which said ink has an optical density value of 1.0 or more as measured by a reflection densitometer when said ink is applied and dried in a thickness of 50 μm onto a transparent sheet placed on a black standard board, and in which said ink has an optical density value of 0.7 or less as measured by said reflection densitometer when said transparent sheet is placed on a white standard board.

2. An emulsion ink for stencil printing according to claim 1, in which said ink has 32 or less of flow value in one minute as measured by a spreadometer.

3. An emulsion ink for stencil printing, which comprises an oil phase and a water phase and contains in said oil phase a coloring pigment together with an extending pigment that is insoluble in said oil phase, in which said coloring pigment constitutes 0.02 to 1% by weight of the total weight of the ink.

4. An emulsion ink for stencil printing according to claim 3, in which said extending pigment constitutes 1 to 5% by weight of the total weigh of the ink.

5. An emulsion ink for stencil printing according to claim 3, in which said extending pigment is inorganic fine particles.

6. An emulsion ink for stencil printing according to claim 3, in which said extending pigment is organic fine particles.

7. An emulsion ink for stencil printing according to claim 5, in which said inorganic particles are those subjected to lipophilic treatment.

8. The emulsion ink according to claim 1, wherein said ink has an optical density value of 1.1 or more on said black standard board and 0.6 or less on said white standard board.

9. The emulsion ink according to claim 1, wherein said coloring pigment constitutes 0.2 to 1% by weight of the total weight of the ink.

10. The emulsion ink according to claim 9, wherein said coloring pigment constitutes 0.05 to 0.9% by weight of the total weight of the ink.

11. The emulsion ink according to claim 1, wherein said oil phase further comprises a solvent.

12. The emulsion ink according to claim 1, wherein said oil phase further comprises an emulsifier.

13. The emulsion ink according to claim 1, wherein said oil phase further comprises a resin.

14. The emulsion ink according to claim 3, wherein said coloring pigment constitutes 0.05 to 0.9% by weight of the total weight of the ink.

* * * * *